United States Patent [19]

Anzai

[11] Patent Number: 4,689,710
[45] Date of Patent: Aug. 25, 1987

[54] PROTECTIVE RELAY FOR AN ELECTRIC POWER SYSTEM INCLUDING DECISION-MAKING COMPUTER MEANS

[75] Inventor: Toshio Anzai, Hyogo, Japan

[73] Assignee: Mitsubishi Denki Kabushiki Kaisha, Tokyo, Japan

[21] Appl. No.: 845,258

[22] Filed: Mar. 28, 1986

[30] Foreign Application Priority Data

Mar. 29, 1985 [JP] Japan .................. 60-66039
Mar. 29, 1985 [JP] Japan .................. 60-66040
Mar. 29, 1985 [JP] Japan .................. 60-66041

[51] Int. Cl.$^4$ ............................ H02H 3/26
[52] U.S. Cl. ...................... 361/87; 361/93
[58] Field of Search ............ 361/87, 78, 93, 94, 361/96, 98, 100

[56] References Cited

U.S. PATENT DOCUMENTS

| | | | |
|---|---|---|---|
| 4,219,858 | 8/1980 | DePuy et al. | 361/93 |
| 4,266,259 | 5/1981 | Howell | 361/94 X |
| 4,331,999 | 5/1982 | Engel et al. | 361/94 |
| 4,377,836 | 3/1983 | Elms et al. | 361/96 |
| 4,403,213 | 9/1983 | Khamare et al. | 361/87 X |
| 4,497,010 | 1/1985 | Funahashi | 361/98 X |

FOREIGN PATENT DOCUMENTS 55-23779 2/1980 Japan .

Primary Examiner—A. D. Pellinen
Assistant Examiner—A. Jonathan Wysocki
Attorney, Agent, or Firm—Bernard, Rothwell & Brown

[57] ABSTRACT

A protective relay for use in deciding an operating condition of an electric power system with a digital computer and protecting equipment connected to the electric power system. Basically, the protective relay is required to operate under an internal fault and not to operate under an external fault. The protective relay has a first comparison and decision element for determining whether the fault is an internal fault or an external fault by comparing a ratio between a vector summation (actuating quantity) and its maximum value (restraining quantity) in respect to an instantaneous electric current in the system. A second comparison and decison element decides whether the system is in a fault condition or not by detecting the actuating quantity in reference to its level with an output of the second comparison and decision element being inhibited by the output of the first comparison and decision element. The external fault is instantaneously judged by the first comparison and decision element and if a current transformer becomes saturated under the external fault and an excessive actuating quantity is generated, the relay is constructed with a return timer or a memory of the restraining amount in such a way as to continue inhibiting the second comparison and decision element to inhibit an erroneous operation of the protective relay.

8 Claims, 11 Drawing Figures

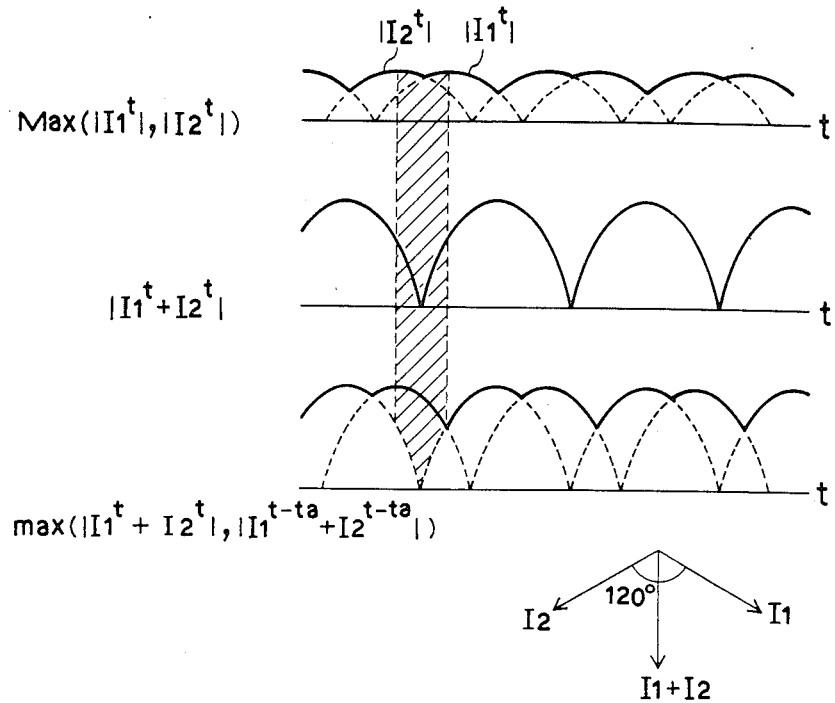
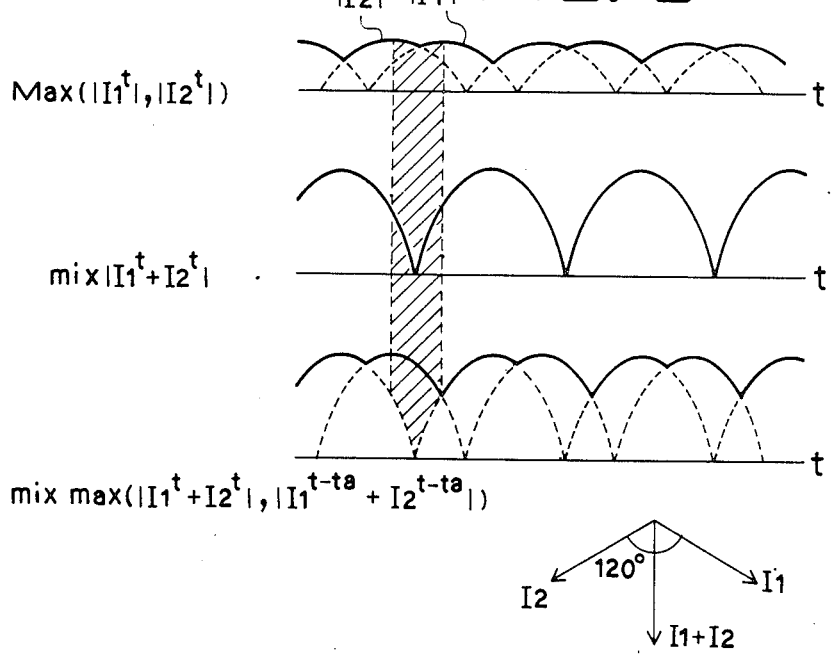

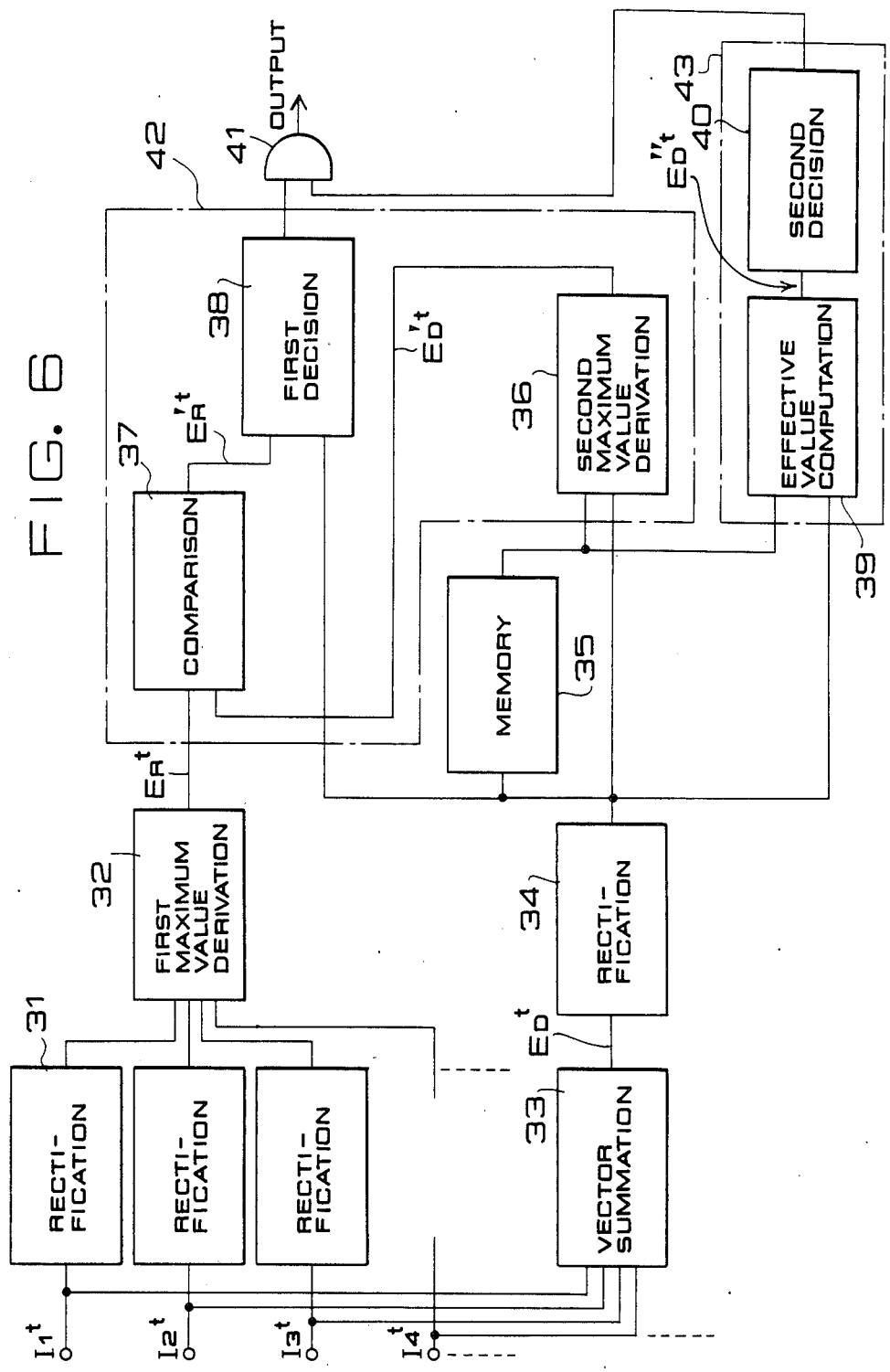

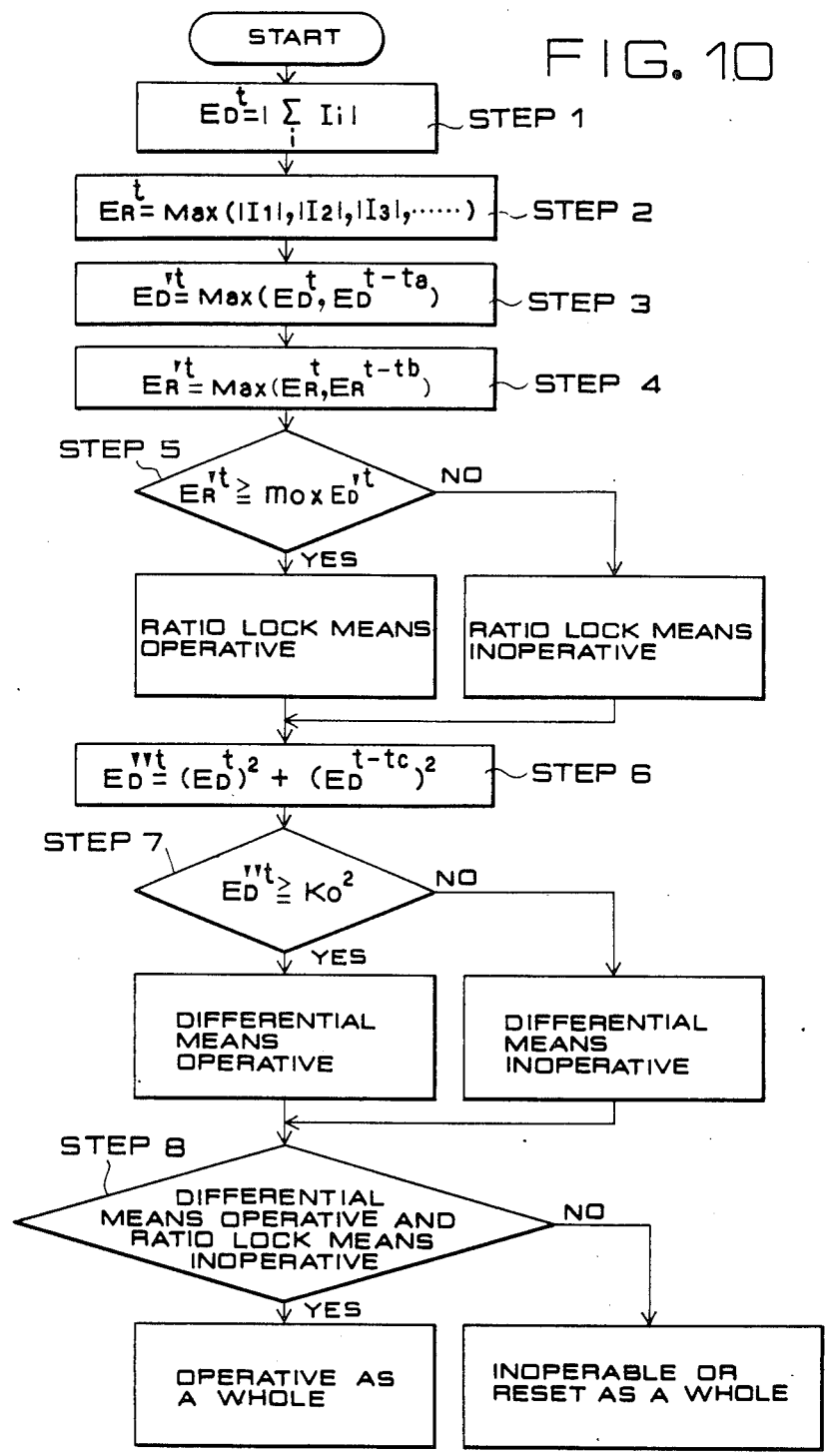

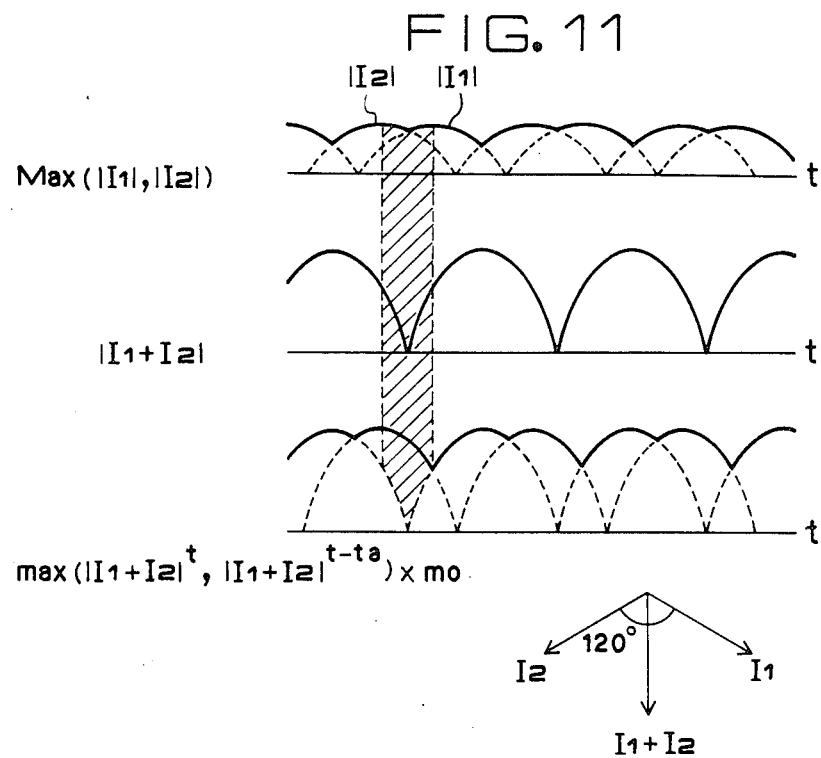

PROTECTIVE RELAY FOR AN ELECTRIC POWER SYSTEM INCLUDING DECISION-MAKING COMPUTER MEANS

BACKGROUND OF THE INVENTION

1. Field of the Invention

The present invention relates to a protective relay and more particularly to the one which makes decisions about operating conditions of an electric power system by the use of a digital computer thereby to protect equipment in the system.

2. Description of the Prior Art

FIG. 1 is an explanatory drawing of the principle of a protective relay indicated in Japanese Patent Laid-open No. 55-23779 (1980), wherein reference numeral 1 denotes rectifying and smoothing means for rectifying and smoothing electric current in a system, 2 denotes vector summation means for providing the vector sum of electric current values of the systems, 3 denotes scalar summation means for summing the above rectified and smoothed current values, 4 denotes rectifying and smoothing means for rectifying and smoothing the mentioned vector sum, 5 denotes comparison and decision means for comparing the mentioned vector sum (actuating quantity) and scalar sum (restraining quantity) to make a decision, and 6 denotes output means for outputting the result of the decision.

Now, the working principle of the apparatus of FIG. 1 will be described below with reference to the following operational expressions (1) and (2):

$$\left|\left|\sum_i I_i^t\right|\right| \geq K_1 \times \left(\sum_i \|I_i^t\|\right) + K_0 \quad (1)$$

$$(\|I^t\| = |I^t| + |I^{t-3}| + K_2 \times ||I^t| - |I^{t-3}||) \quad (2)$$

where $I_i^t$ is a current value sampled at the time t and the subscript i represents a terminal number. And $\Sigma I_i^t$ represents a vector sum, $\|I^t\|$ represents rectified and smoothed value, and $$\sum_i \|I_i^t\|$$

represents scalar sum, while $K_0$, $K_1$, and $K_2$ are constants. Further, in the above example, the sampling frequency is arranged to be 12 times as large as the system frequency (30° sampling).

Operations in FIG. 1 will be described below. All the sampled current values $I_i^t$ of the system are rectified and smoothed by the rectifying and smoothing means 1 in the manner as indicated in the expression (2) and turned into $\|I_i^t\|$ and the same are subjected to the scalar summing operation by the scalar summation means 3 and turned into $$\sum_i \|I_i^t\|.$$

The above mentioned current values $I_i^t$ are also subjected to the vector summing operation by the vector summation means 2 and, further, rectified and smoothed by the rectifying and smoothing means 4 to be turned into $$\left|\left|\sum_i I_i^t\right|\right|.$$

In the comparison and decision means 5, the mentioned output $$\sum_i \|I_i^t\|$$

of the scalar summation means 3 is multiplied by an appropriate constant and the same and the above mentioned output $$\left|\left|\sum_i I_i^t\right|\right|$$

of the rectifying and smoothing means 4 together are subjected to the decision in accordance with the expression (1). If as the result the expression (1) holds true, an actuating signal is output from the comparison and decision means 5. The output means 6 provides an appropriate time delay for the mentioned signal and outputs the same as a final actuating signal.

With the above operational expression, it is intended to provide the differential characteristic as indicated in the solid line (B) in the operating characteristic curve of a general differential protective relay as shown in FIG. 2, wherein the minimum operating value is $K_0$ and the ratio is $K_1$ in the expression (1). Now, if instantaneous values only were rectified, there would be produced pulsating quantity and, hence, fluctuation in the operating characteristic depending on the sampling phase. Therefore, such rectifying and smoothing computation, for example, as indicated in the expression (2) must be made. By the computation according to the expression (2), it is intended to provide an effect substantially in the form of four-phase rectification and thereby to decrease the errors of the operating value and lessen the fluctuation of the differential characteristic depending on the sampling phase.

The prior art protective relay was structured as described above. Therefore, in such a case where the same was employed for protection of a bus-bar and therefore multiple-terminal data must be handled, a very long time was taken for computational processing of the expression (2). Thus, to avoid malfunction due to a CT saturation phenomenon or the like, it was required, for example, that values of the constants $K_0$, $K_1$ or the like were automatically varied depending on the quantity of the current so that the slope of the operating characteristic would be greatly varied in the larger current range. Thus, there were such problems that great restrictions were placed on the operating time as well as on the processing capacity of the computer.

SUMMARY OF THE INVENTION

A primary object of the invention is to provide a useful protective relay in which defects in the prior art apparatus are overcome.

Another object of the invention is to provide a protective relay performing computational processing with ease and being quick in response.

A further object of the invention is to provided a protective relay capable of a stable operation even at the time of CT saturation.

Other objects and advantages of the invention will become more apparent from the following detailed description taken in connection with the accompanying drawings.

BRIEF DESCRIPTION OF THE DRAWINGS

FIG. 5 is a drawing helpful in an understanding of the principle of phase characteristic compensation in the present invention;

FIG. 6 is an operation block diagram of a protective relay for a system according to another preferred embodiment of the invention;

FIG. 8 is a drawing helpful to an understanding of the principle of phase characteristic compensation in the embodiment of FIG. 6;

FIG. 10 is a flow chart for the apparatus of FIG. 9; and

FIG. 11 is a drawing helpful in an understanding of the principle of phase characteristic compensation in the embodiment of FIG. 9.

DESCRIPTION OF THE PREFERRED EMBODIMENTS

Figure 3:
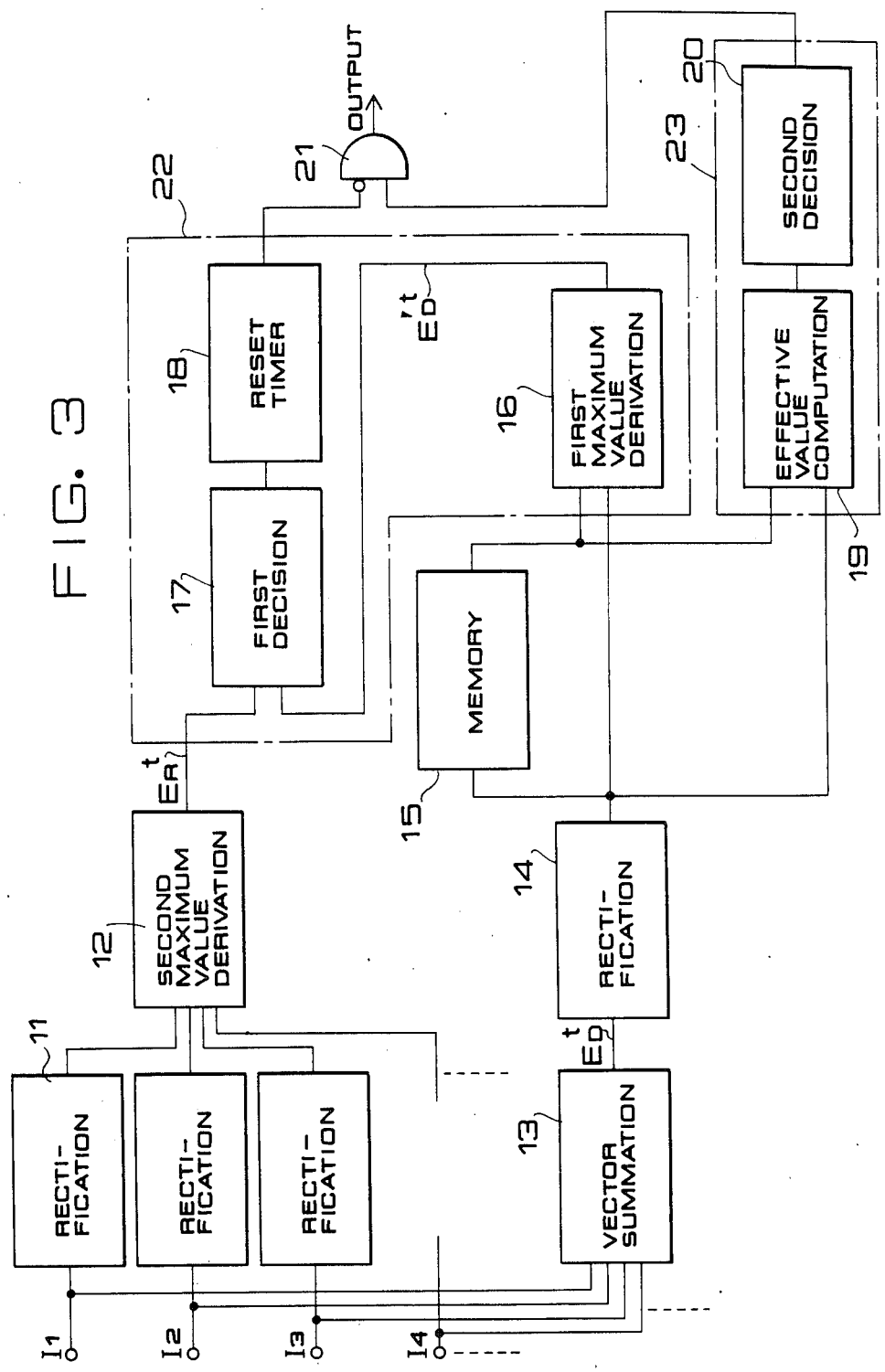
FIG. 3 is a block diagram helpful to an understanding of the working principle of a protective relay for a system according to a preferred embodiment of the invention.

A preferred embodiment of the invention will be described in the following with reference to the accompanying drawings. In FIG. 3, numeral reference 11 denotes rectifying means for rectifying a sampled current value in a system, 12 denotes second maximum value deriving means for picking out the maximum instantaneous value (restraining quantity) of the above rectified currents, 13 denotes vector summation means for providing a vector sum of the above sampled current values, 14 denotes rectifying means for rectifying the mentioned vector sum, 16 denotes first maximum value deriving means for picking out the maximum value (differential quantity) of the above rectified sum provided by the vector summation means and the sums obtained in the several preceeding sampling processes and stored in the memory means 15, 17 denotes a first decision means for comparing the mentioned restraining quantity and differential quantity and making a decision, 18 denotes a reset timer, 19 denotes effective value computing means for computing sum of squares of the above rectified vector sum and a sum obtained in a certain preceding sampling process and stored in the memory means 15, 20 denotes second decision means for comparing the mentioned value of sum of squares with a criterion value and delivering its decision as the result of the comparison, 21 denotes inhibit means for locking the output of the decision means 20 by an output of the reset timer 18, 22 denotes ratio lock means (first comparison and decision means) for making comparison and decision in accordance with the following principle expression (3), and 23 denotes differential means (second comparison and decision means) for making comparison and decision in accordance with the following principle expression (4).

$$\text{Max}_i |I_i^t| - m_0 \times \text{Max}\left(\left|\sum_i I_i^t\right|, \left|\sum_i I_i^{t-ta}\right|\right) \geq 0 \quad (3)$$

$$\left|\left|\sum_i I_i^t\right|\right| \geq K_0 \quad (4)$$

where $m_0$, $K_0$ are constants and $I_i^{t-ta}$ represents a value obtained in a sampling process conducted a time $t_a$ before. (Hereinafter, the mentioned first comparison and decision means will be called the ratio lock means and the second comparison and decision means will be called the differential means.)

Figure 4:
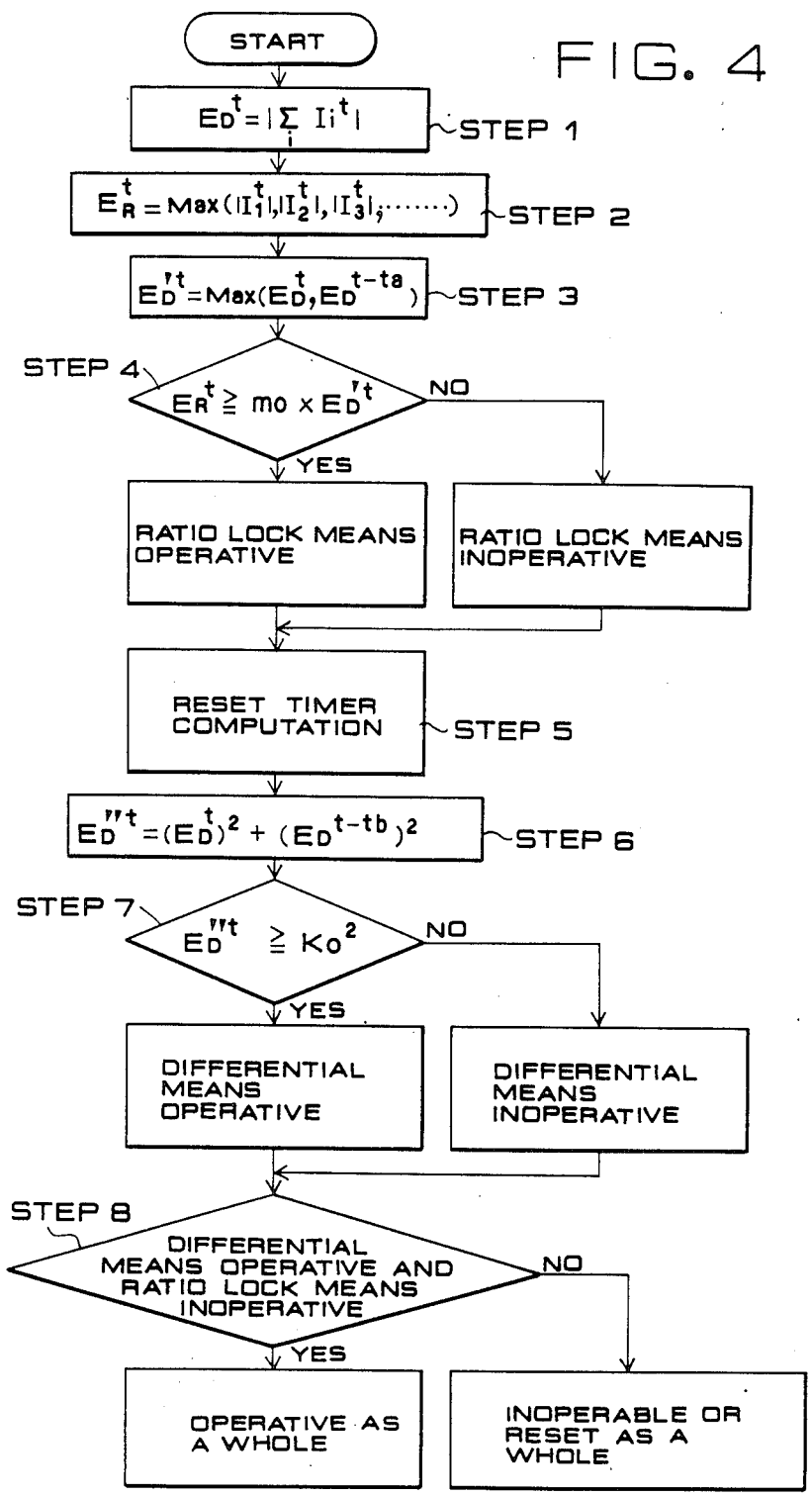
FIG. 4 is a flow chart for the apparatus of FIG. 3.

Now, operations in FIG. 3 will be described below. If the block diagram of FIG. 3 is developed into a program using a digital computer, a flow chart as shown in FIG. 4 is obtained. That is, in the step 1, the current values $I_i^t$ of the systems sampled at the time t and then quantized are summed by the vector summation means 13 to be turned into $E_D{}^t$. In the step 2, the maximum value $E_R{}^t$ (the restraining quantity) of absolute values of all the mentioned current values $I_i^t$ is computed by the maximum value deriving means 12. Then, in the step 3, the maximum value $E_D{}''^t$ (the differential quantity) of the mentioned vector sum $E_D{}^t$ and vector sums obtained in the sampling processes conducted in the preceding time $t_a$ is computed by the maximum value deriving means 16. In the step 4, the mentioned differential quantity $E_D{}''^t$ is multiplied by $m_0$ and the same and the mentioned restraining quantity $E_R{}^t$ are compared in magnitude by the decision means 17 and the same makes a decision to render the ratio lock means 22 operative when the latter is larger than or equal to the former and, otherwise, to render the ratio lock means 22 inoperative. In the step 5, the reset timer 18, when the decision in the mentioned step 4 was for rendering operative, outputs the 'operative' result as it is, and, when the decision was for rendering inoperative, makes reset timer computation such that the same successively outputs the 'operative' result for the period of appropriate counts. Then, in the step 6, computation is made by the effective value computing means 19 to provide sum of squares, $E_D{}'''^t$, of the above mentioned vector sum $E_D{}^t$ and the vector sum $E_D{}^{t-tb}$, which is a vector sum obtained a time $t_b$ before. And, in the step 7, the mentioned sum of squares $E_D{}'''^t$ and a constant $K_0{}^2$ are compared in magnitude by the decision means 20 and the same makes a decision, when the former is larger then or equal to the latter, to render the differential means operative and, otherwise, to render the differential means inoperative. In the step 8, the inhibit means 21, based upon results of the decisions in the step 4 and the step 7, makes a decision, only when the ratio lock means is rendered inoperative and the differential means is rendered operative, to operate itself and deliver a final output to render the apparatus as a whole operative and, otherwise, to deliver a final output to make the apparatus as a whole inoperative or reset. Incidentally, the step 1 and the step 2, the step 2 and the step 3, the steps 2–5 and the steps 6–7 may be processed in reverse order. In the case where the current values of the systems, $I_i^t$, vary sinusoidally with time, the above mentioned sum of squares $E_D{}'''^t$, when the time $t_b$ is properly set up, becomes a square of the effective value, of which explanation is omitted here since it is a known fact.

If $t_b = 90$ (degree)

$$(E_D{}^t)^2 + (E_D{}^{t-tb})^2 = |E_D|^2(\sin^2 \omega t + \cos^2 \omega t) = |E_D|^2.$$

Further, the decision sections in FIG. 4 may be adapted to make the checking several times for the sake of stabilization of the characteristics (which is obvious and so explanation thereof is omitted).

Figure 1:
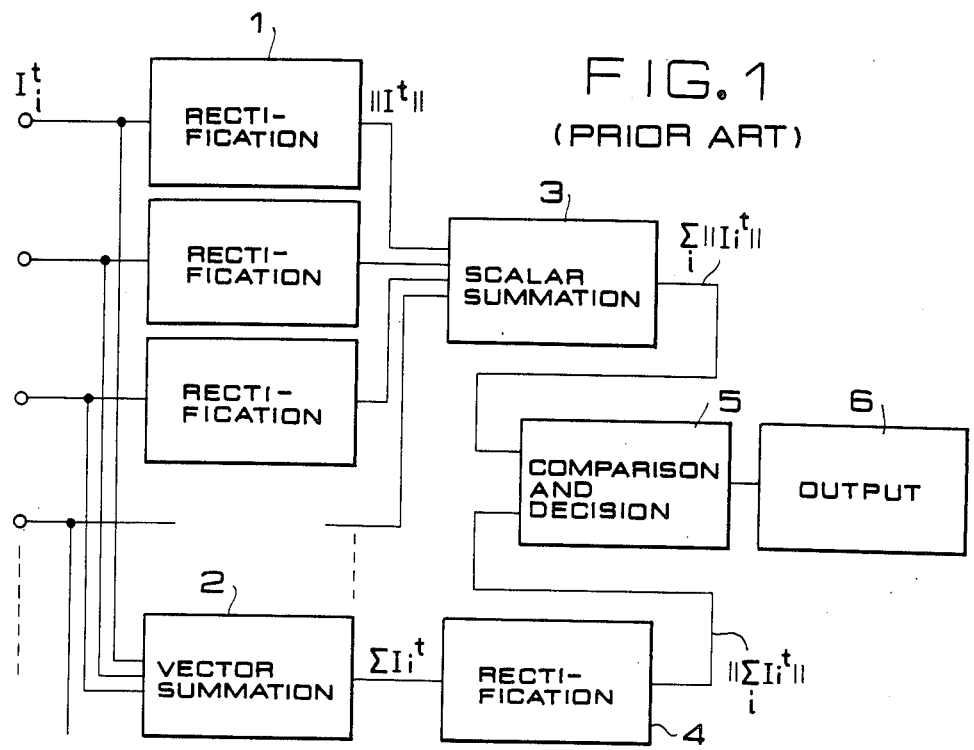
FIG. 1 is an operational block diagram of a prior art protective relay.
Figure 2:
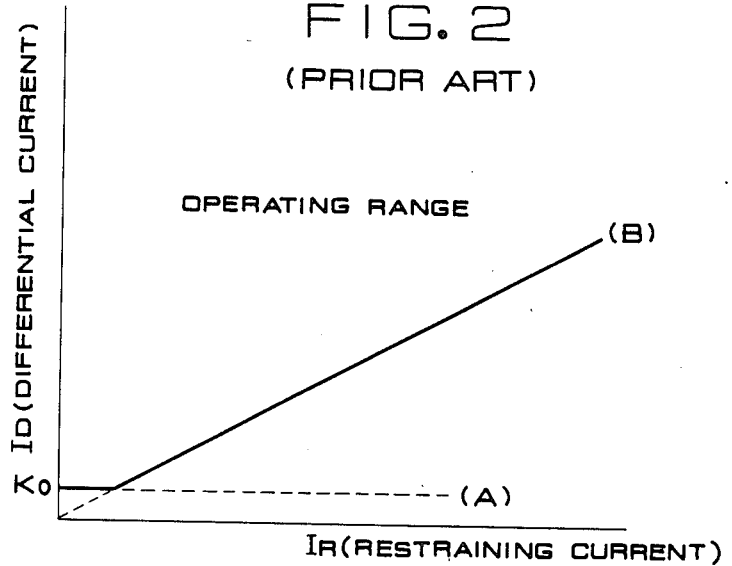
FIG. 2 is an operating characteristic curve of a general differential protective relay.

According to the present invention, the full line (B) in FIG. 2 is determined by the above mentioned principle expression (3) and the dotted line (A) in FIG. 2 is determined by the principle expression (4) and thereby the ratio-differential characteristic the same as before can be obtained. Further, since the decision in accordance with the principle expression (3) is made only by the ratio between the differential quantity $E_D{}^{\prime t}$ and restraining quantity $E_R{}^t$, the decision can be made by instantaneous values, and since the solid line (B) becomes a straight line passing the origin, there is provided such a characteristic that the minimum actuating value ($K_0$) and the ratio ($m_0$) can each be set up independently of each other. Furthermore, in the case where the terminal currents are neither in-phase nor 180° out-of-phase as indicated in FIG. 5, such a temporal range (the portion marked by slash lines in FIG. 5) in which the restraining quantity $E_R{}^t$ instantaneously exceeds the vector sum $E_D{}^t$ even if the operating range is prevented from being produced by compensation with the vector sum $E_D{}^{t-ta}$ stored in the memory, and thereby the operating range is prevented from becoming narrower by instantaneous computation depending upon the phase characteristic. In the case of FIG. 5, the waveforms of the computed quantities shown are those at the time when the two terminal currents are 120° out-of-phase. Besides, in the event of an external accident, an extremely large current will flow through the current transformer on the flow-out side and thereby the CT will be saturated and the secondary current of the CT will be decreased instantaneously, and as a result, an extremely large differential current will be apparently produced. According to the present invention, however, the ratio lock means making the decision in accordance with the principle expression (3) must have operated before the saturation occurs, and therefore, the period of time when the extremely large differential quantity is produced will be covered by the reset timer and the locked state may continue, whereby malfunction will be prevented from occurring.

Although sum of squares has been employed in the decision according to the expression (4) in the embodiment described above, that is a decision of level, in principle. And so, even if the rectification and smoothing computation according to the expression (2) described with reference to the prior art example, or such an integrating computation as in the following expression (5), is employed, the same effect as in the above embodiment can be obtained.

$$\left|\left|\sum_i I_i{}^t\right|\right| = \sum_j \left|\sum_i I_i\right|^{t-tj} = \qquad (5)$$

$$\left|\sum_i I_i\right|^t + \left|\sum_i I_i\right|^{t-t1} + \left|\sum_i I_i\right|^{t-t2} + \ldots$$

Now, another embodiment of the present invention will be described with reference to FIGS. 6 to 8. Referring first to FIG. 6, 31 denotes rectifying means for rectifying the sampled current value of a system, 32 denotes first maximum value deriving means for picking out the maximum instantaneous value (restraining quantity) of the above rectified current values, 33 denotes vector summation means for providing a vector sum of the currents of the systems, 34 denotes rectifying means for rectifying the mentioned vector sum, 35 denotes memory means for storing the above rectified vector sum, 36 denotes second maximum value deriving means for picking out the maximum value (restraint control quantity) of the above rectified sum of the vector summation means 33 and the sum obtained in some preceding sampling processes and stored in the memory means 35, 37 denotes comparison means for providing weighted difference between the mentioned restraining quantity and the restraint control quantity and outputting, if it is positive, the value of the difference, 38 denotes first decision means for comparing the mentioned difference value output from the comparison means 37 and the above mentioned rectified sum of the vector summation means 33 and making a decision according to their magnitude, 39 denotes effective value computing means for providing sum of squares of the above mentioned rectified sum of the vector summation means 33 and a vector sum obtained a certain number of sampling processes before and stored in the memory means 35, 40 denotes second decision means for comparing the mentioned sum of squares and a criterion value and making a decision according to their magnitude, 41 denotes AND means for providing a logical product of the outputs of the first decision means 38 and second decision means 40 and delivering the same as a final output, 42 denotes first comparison and decision means (hereinafter to be called the ratio means) for making a decision in accordance with the following expression (6), and 43 denotes second comparison and decision means (hereinafter to be called the differential means) for making a decision in accordance with the following expression (7).

$$\left|\sum_i I_i{}^t\right| - m_0\left(\max_i |I_i{}^t| - m_1 \times \max\left(\left|\sum_i I_i{}^t\right|, \left|\sum_i I_i{}^{t-ta}\right|\right)\right)^+ \geq 0 \qquad (6)$$

$$\left|\left|\sum_i I_i{}^t\right|\right| \geq K_0 \qquad (7)$$

where it is made such that $\{\ \}^+$ is valid only when the value inside the braces is positive (otherwise 0) and $m_0$, $m_1$, $K_0$ are constants, and $I_i{}^{t-ta}$ represents the sampled value obtained the time $t_a$ before.

Operations of FIG. 6 will be described in the following. When the block diagram of FIG. 6 is developed into a program using a digital computer, a flow chart as indicated in FIG. 7 is obtained.

In the step 1, the current values $I_i{}^t$ of the systems sampled at the time t and then quantized are summed by the vector summation means 33 to be turned into $E_D{}^t$. In the step 2, the maximum value $E_R{}^t$ of absolute values of all the mentioned current values $I_i{}^t$ is computed by the maximum value deriving means 32. Then, in the step 3, the maximum value (the restraint control quantity) $E_D'^t$ of the sum $E_D^t$ summed by the vector summation means 33 and vector sums $E_D^{t-ta}$ obtained in the sampling processes conducted during the preceding time $t_a$ is computed by the maximum value deriving means 36. In the step 4, the difference between the above $E_R^t$ and the $E_D'^t$ multiplied by $m_1$ is obtained, and if the difference is positive, the same is made into restraining quantity $E_R'^t$, and if the same is negative, the restraining quantity $E_R'^t$ is turned into 0. In the step 5, the mentioned $E_R'^t$ is multiplied by $m_0$ and the above mentioned $E_D^t$ are compared in magnitude by the comparison means 37, and a decision is made by the first decision means 38 such that, if the latter is larger than or equal to the former, the ratio means 42 is rendered operative and, otherwise, the ratio means is rendered inoperative. In the step 6, sum of squares, $E_D'''^t$, of the above mentioned $E_D^t$ and the vector sum $E_D^{t-tb}$, which was obtained the time $t_b$ before, is computed by the effective value computing means 39, and in the step 7, the mentioned $E_D'''^t$ and the constant $K_0^2$ are compared in magnitude and a decision is made such that, if the former is larger than or equal to the latter, to render the differential means 43 operative and, otherwise, to render the differential means 43 inoperative by the second decision means 40. In the step 8, the AND means 41, based upon result of decisions in the step 5 and the step 7, makes a decision, only when the ratio means 42 and the differential means 43 are both operative, to deliver a final output to make the apparatus as a whole rendered operative and, otherwise, to deliver a final output to make the apparatus as a whole rendered inoperative or reset. Incidentally, the step 1 and the step 2, the step 3 and the step 4, the steps 2–5 and the steps 6–7 may be processed in reverse order. In the case where the values $I_i^t$ vary sinusoidally, the above mentioned sum of squares $E_D'''^t$, when the time $t_b$ is properly set up, becomes a square of the effective value, of which explanation is omitted here since it is a known fact.

If $t_b=90$ (degree)

$$(E_D^t)^2+(E_D^{t-tb})^2=|E_D|^2(\sin^2\omega t+\cos^2\omega t)=|E_D|^2.$$

Figure 7:
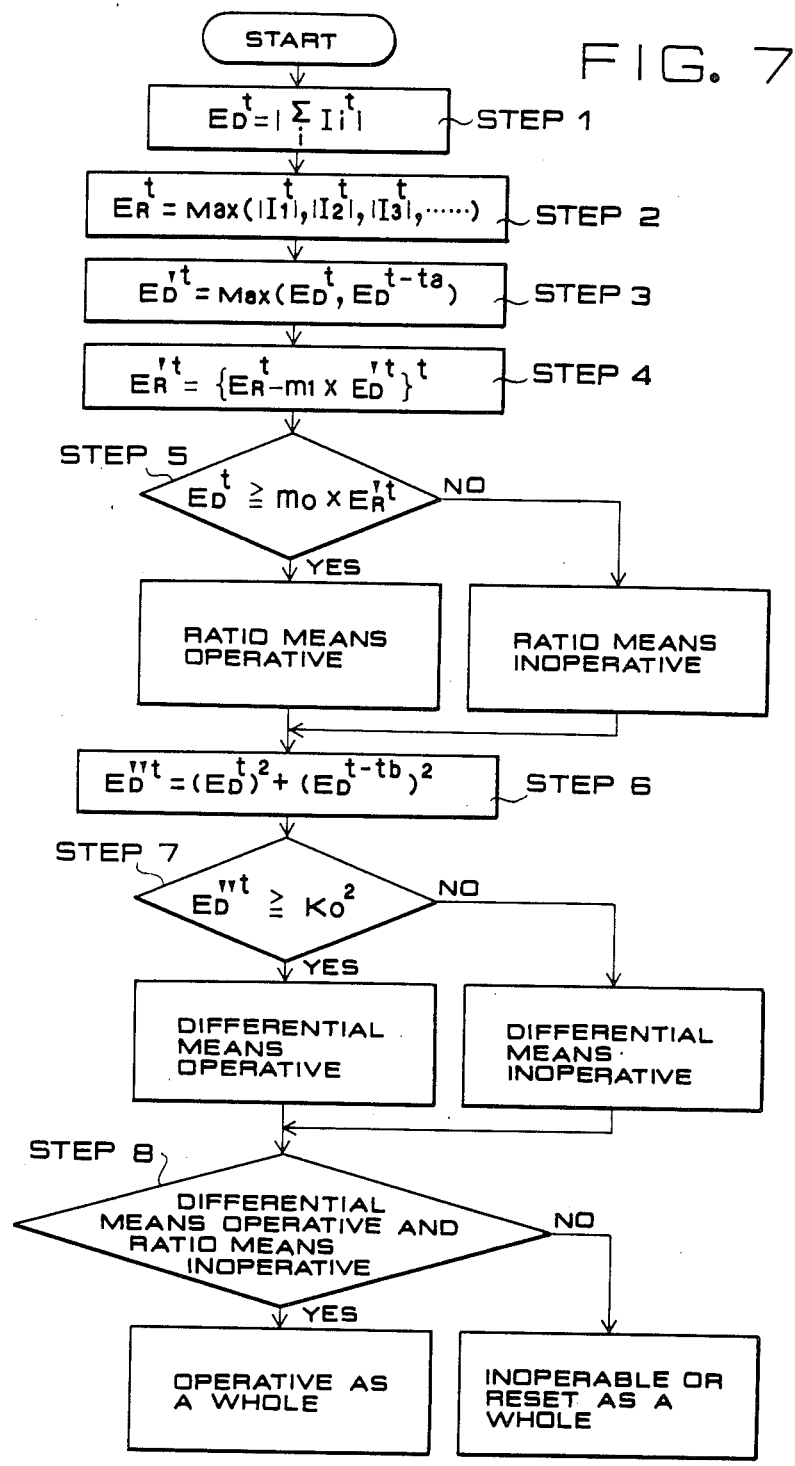
FIG. 7 is a flow chart for the apparatus of FIG. 6.

And, further, the decision sections in FIG. 7 may be adapted to make the checking several times for the sake of stabilization of the characteristics (which is obvious and so explanation thereof is omitted). According to the present invention, the full line (B) in FIG. 2 is determined by the above mentioned principle expression (6) and the dotted line (A) in FIG. 2 is determined by the principle expression (7) and thereby the ratio-differential characteristic the same as before can be obtained. Further, since the decision in accordance with the principle expression (6) is made only by the ratio between the differential current $E_D'^t$ and the restraining quantity $E_R'^t$, the decision can be made by instantaneous values, and since the solid line (B) becomes a straight line passing the origin, there is provided such a characteristic that the minimum actuating value and the ratio can each be set up independently of each other. And, by making $m_0$ larger than $m_1$, a larger restraining quantity $E_R'^t$ can be produced when the value inside the braces { } in the second term of the expression (6) is positive, and therefore the portion around the boundary in the differential characteristic between greatly stabilized. Furthermore, in the case where the terminal currents are neither in-phase nor in 180° out-of-phase as indicated in FIG. 8, such a temporal region $(E_R^t>E_D^t)$ in which the value inside the braces { } in the second term of the expression (6) instantaneously becomes positive is compensated by stored differential quantity $E_D^{t-ta}$, and thereby the operating range is prevented from becoming narrower depending upon the phase characteristic. In the case of FIG. 8, the waveforms of the computed quantities indicated are those at the time when the two terminal currents are 120° out-of-phase.

Figure 9:
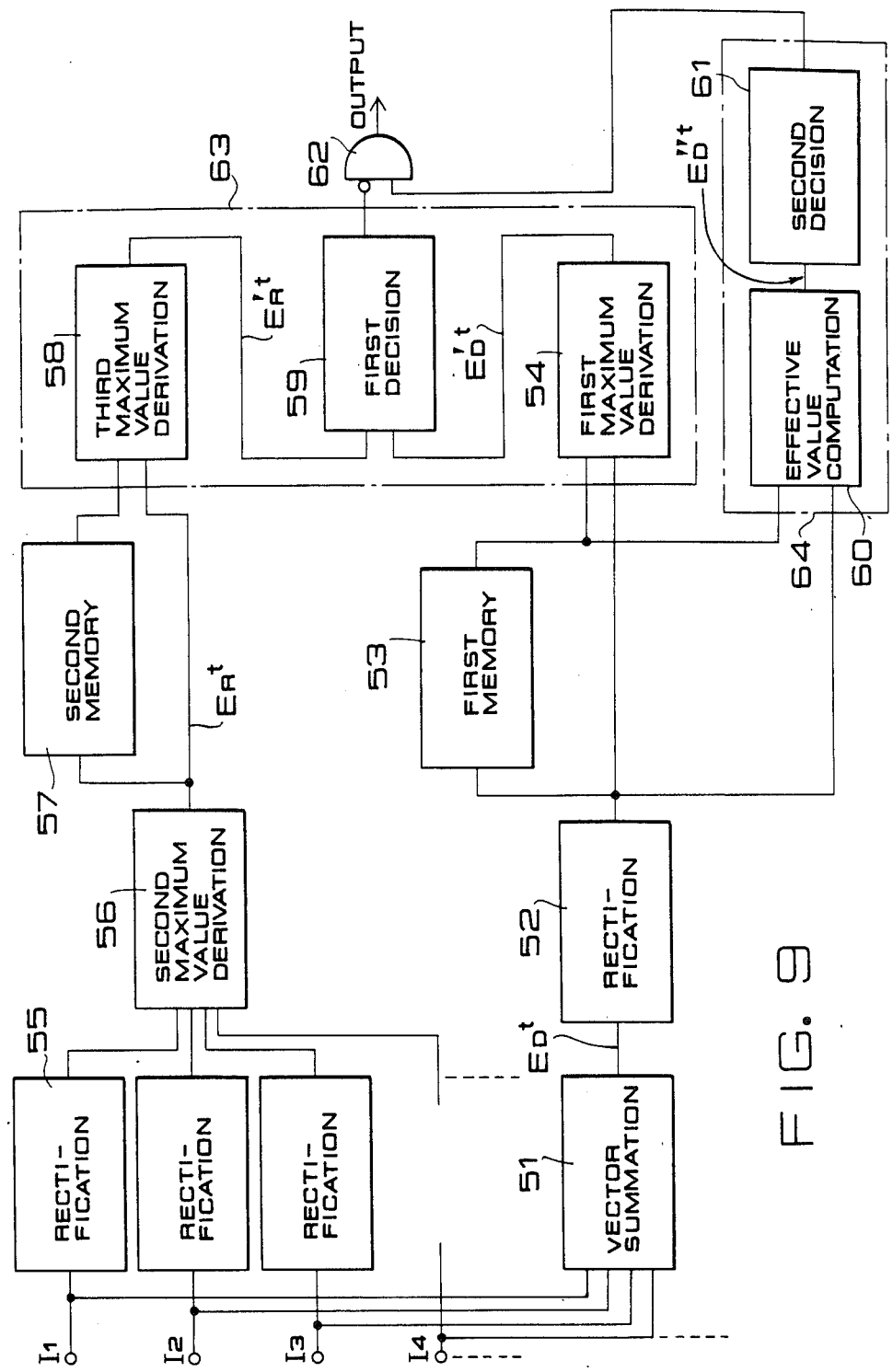
FIG. 9 is an operational block diagram of a protective relay for a system according to still another preferred embodiment of the invention.

A further embodiment of the present invention will be described in the following with reference to FIGS. 9–11. Referring first to FIG. 9, 51 denotes vector summation means 51 for providing a vector sum of the sampled electric current values of the systems, 52 denotes rectifying means for rectifying the mentioned vector sum, 53 denotes first memory means for storing the above rectified sums provided by the vector summation means 51, 54 denotes first maximum value deriving means for picking out the maximum value (the differential value) of the outputs of the rectifying means 52 and the first memory means 53, 55 denotes rectifying means for rectifying the above sampled electric current values of the systems, 56 denotes second maximum value deriving means for picking out the maximum instantaneous value of the above rectified electric current values, 57 denotes second memory means for storing the above picked out maximum instantaneous value, 58 denotes third maximum value deriving means for picking out the maximum value (the restraining quantity) of the second maximum value deriving means 56 and the second memory means 57, 59 denotes first decision means for making a decision of level according to relative magnitude between the differential quantity and the restraining quantity, 60 denotes effective value computing means for providing a sum of squares of the above rectified sum provided by the vector summation means 51 and a sum obtained a certain number of sampling processes before and stored in the first memory means 53, 61 denotes second decision means for making a decision about relative magnitude between the sum of squares and a criterion value and outputting the result, 62 denotes inhibit means for locking the output of the second decision means 61 by the output of the first decision means 59, 63 denotes ratio lock means (first comparison and decision means) for making a decision in accordance with the following principle expression (8), and 64 denotes differential means (second comparison and decision means) for making a decision in accordance with the following principle expression (9).

$$\text{Max}\left(|I_i^t|, |I_i^{t-tb}|\right) - m_0 \times \text{Max}\left(\left|\sum_i I_i^t\right|, \left|\sum_i I_i^{t-ta}\right|\right) \geq 0 \tag{8}$$

$$\left|\left|\sum_i I_i^t\right|\right| \geq K_0 \tag{9}$$

where $m_0$, $K_0$ are constants, and $I_i^{t-ta}$, $I_i^{t-tb}$ are current values sampled the times $t_a$, $t_b$ before, respectively. Hereinafter, the first comparison and decision means will be called the ratio lock means and the second comparison and decision means will be called the differential means.

Operations of FIG. 9 will be described below. When the block diagram of FIG. 9 is developed into a program using a digital computer, it is represented by the flow chart of FIG. 10.

That is, in the step 1, vector sum $E_D{}^t$ of the electric current values $I_i{}^t$ sampled at the time t and quantized is computed by the vector summation means 51, and in the step 2, the maximum value $E_R{}^t$ of absolute values of all the mentioned current values $I_i{}^t$ is computed by the second maximum value deriving means 56. Then, in the step 3, the maximum value $E_D''{}^t$ (the differential quantity) of the above vector sum $E_D{}^t$ and the vector sums $E_D{}^{t-ta}$ obtained in the preceding time $t_a$ is computed by the first maximum value deriving means 54, and in the step 4, the maximum value $E_R''{}^t$ (the restraining quantity) of the maximum value $E_R{}^t$ computed in the step 2 and the maximum value $E_R{}^{t-tb}$ obtained in the preceding time $t_b$ is computed by the third maximum value deriving means 58. In the step 5, the above mentioned $E_D''{}^t$ multiplied by $m_0$ is compared with the restraining quantity $E_R''{}^t$ in magnitude and a decision is made, if the latter is larger than or equal to the former, to render the ratio lock means 63 operative and, otherwise, to render the ratio lock means inoperative by the first comparison and decision means 59. In the step 6, a sum of squares $E_D'''{}^t$ of the value $E_D{}^t$ summed by the vector summation means 51 and the vector sum $E_D{}^{t-tc}$ obtained the time tc before is computed by the effective value computing means 60. In the step 7, the mentioned sum of squares $E_D'''{}^t$ and the constant $K_0{}^2$ are compared in magnitude and such an operation is made, if the former is larger than or equal to the latter, as to render the differential means operative and, otherwise, to render the differential means inoperative by the second comparison and decision means 61. In the step 8, based upon the decision made in the above steps 5 and 7, it is decided, only when the ratio lock means 63 is rendered inoperative and the differential element 64 is rendered operative, to deliver a final output to render the apparatus as a whole operative and, otherwise, to deliver a final output to make the apparatus as a whole rendered inactive or reset by the inhibit means 62. Incidentally, the step 1 and the step 2, the step 2 and the step 3, the step 3 and the step 4, and the steps 2–5 and the steps 6–7 may be operated in reverse order. When the current $I_i{}^t$ of each the system sinusoidally varies with time, the above mentioned sum of squares $E_D'''{}^t$ becomes, if the time $t_c$ is set at an appropriate value, a square of the effective value, of which explanation is omitted here since it is known fact.

If $t_c = 90$ (degree)

$$(E_D{}^t)^2 + (E_D{}^{t-tc})^2 = |E_D|^2(\sin^2 \omega t + \cos^2 \omega t) = |E_D|^2.$$

And, further, the decision sections in FIG. 10 may be adapted to make the checking several times for the sake of stabilization of the characteristics (which is obvious and so explanantion thereof is omitted).

According to the present invention, the full line (B) in FIG. 2 is determined by the above mentioned principle expression (8) and the dotted line (A) in FIG. 2 is determined by the principle expression (9) and thereby the ratio-differential characteristic the same as before can be obtained. Further, since the decision in accordance with the principle expression (8) is made only by the ratio between the differential quantity $E_D''{}^t$ and the restraining quantity $E_R''{}^t$, the decision can be made by instantaneous values, and since the solid line (B) becomes a straight line passing the origin, there is provided such a characteristic that the minimum actuating value ($K_0$) and the ratio ($m_0$) can each be set up independently of each other. Furthermore, in the case where the terminal currents are neither in-phase nor in 180° out-of-phase as indicated in FIG. 11, such a temporal range (the portion marked by slash lines in FIG. 11) in which the restraining quantity $E_R''{}^t$ instantaneously exceeds the vector sum $E_D{}^t$ even in the operating range is prevented from being produced by compensation with the vector sum $E_D{}^{t-ta}$ stored in the memory, and thereby the operating range is prevented from becoming narrower by instantaneous computation depending upon the phase characteristic. Besides, in the event of an external accident, an extremely large current will flow through the current transformer on the flow-out side and thereby the CT will be saturated and the secondary current of the CT will be decreased instantaneously, and as a result, an extremely large differential quantity will be apparently produced. According to the present invention, however, the extremely large differential quantity to be produced at the time of the saturation is adapted to be canceled by the stored maximum current value $E_R{}^{t-tb}$ of the systems, the ratio lock means in accordance with the principle expression (8) will not reset and thereby the locked state will continue and malfunction will be prevented from occurring.

According to the present invention, as has so far been described, the computational circuits are structured so as to be able to make computation and decision by instantaneous values of the electric current values of the systems in principle. In such a case where there are many terminals as in the application for protecting a bus-bar, for example, since there is no need for rectifying and smoothing operations as indicated in the earlier described expression (2), and hence the operating time is shortened and a quick response enabled, there are provided such merits that the load for processing to be placed on a digital computer can be reduced as well as the measures in the event of an accident can be taken quickly. Furthermore, a very stable characteristic is provided even when the CT saturation is produced in case of an external accident.

What is claimed is:

1. A protective relay comprising:
   vector summation means taking in instantaneous electric current values from a plurality of systems for computing a vector sum thereof;
   memory means for storing values of the sums provided by said vector summation means;
   maximum value deriving means for picking out the maximum instantaneous value of absolute values of electric currents of said systems,
   first comparison and decision means taking in as input data thereto each of an output of said maximum value deriving means, an output of said vector summation means, and an output of said memory means for producing a ratio-lock-means-inoperative signal when the maximum instantaneous value is less than the product of a first constant and a maximum of the vector sum and the stored vector sum;
   second comparison and decision means taking in as input data the output of said vector summation means and the output of said memory means for producing a differential-means-operative signal when an effective value computed from said vector sum and said stored vector sum is equal to or greater than a second constant; and
   inhibit means for inhibiting output of said second comparison and decision means by output of said first comparison and decision means and delivering an apparatus-as-a-whole-operative signal only upon the occurrence of the ratio-lock-means-inoperative signal and the differential-means-operative signal.

2. A protective relay according to claim 1, wherein said first comparison and decision means includes second maximum values deriving means which takes in the respective outputs of the vector summation means and the memory means for producing the maximum of the vector sum and stored vector sum, first decision means for comparing the outputs of said first maximum value deriving means and said second maximum value deriving means, and reset timer means for providing a ratio-lock-means-operative signal when the first decision means indicates that the maximum instantaneous value is equal to or greater than the maximum of the vector sum and stored vector sum and for providing the ratio-lock-means-inoperative signal a predetermined delay time after the first decision means indicates otherwise.

3. A protective relay according to claim 1, wherein said second comparison and decision means includes effective value computing means taking in the summed value from said vector summation means and the output of the memory means storing said summed value for for computing a sum of squares as the effective value thereof, and second decision means for comparing the output of said effective value computing means with the second constant.

4. A protective relay comprising:
vector summation means taking in electric current values from a plurality of systems for computing a vector sum thereof;
memory means for storing values summed by said vector summation means;
first maximum value deriving means for picking out the maximum instantaneous value of absolute values of the electric current values of said systems;
first comparison and decision means taking in respective outputs of said vector summation means, said memory means, and said maximum instantaneous value deriving means for producing a ratio-means-inoperative signal when the maximum instantaneous value is less than a product of a first constant and a difference of the maximum instantaneous value from a product of a second constant and a maximum of the vector sum and the stored vector sum;
second comparison and decision means taking in outputs of said vector summation means and said memory means for producing a differential-means-operative signal when an effective value computed from said vector sum and said stored vector sum is equal to or greater than a third constant; and
AND means for providing a logical product of outputs of said first and second comparison and decision means and delivering an apparatus-as-a-whole-operative signal.

5. A protective relay according to claim 4, wherein said first comparison and decision means includes second maximum value deriving means taking in outputs of said vector summation means and said memory means for outputting the maximum value thereof, comparison means for comparing output signals of said first and second maximum value deriving means, and first decision means for producing the ratio-means-inoperative signal when the output of the comparison means is greater than the output of the second maximum value deriving means.

6. A protective relay according to claim 4, wherein said second comparison and decision means includes effective value computing means taking in outputs of said vector summation means and said memory means for computing a sum of squares of the same, and second decision means for comparing an output of said effective value computing means with the third constant.

7. A protective relay comprising:
vector summation means taking in electric current values from a plurality of systems for computing a vector sum thereof;
first memory means for storing values of the vector sums from the vector summation means;
first maximum value deriving means deriving the maximum value from said vector summation means and said first memory means;
second maximum value deriving means for picking out the maximum instantaneous value of absolute values of said electric current values;
second memory means for storing the maximum instantaneous value from the second maximum value deriving means;
third maximum value deriving means for deriving the maximum value from the stored maximum instantaneous value from said second memory means and the maximum instantaneous value from said second maximum value deriving means;
first comparison and decision means taking in respective outputs of said third maximum value deriving means and said first maximum value deriving means for comparison thereof to produce a ratio-means-inoperative signal when the latter is less than the former;
second comparison and decision means taking in the vector sum from said vector summation means and the output of said first memory means for producing a differential-means-operative signal when an effective value computed from said vector sum and said stored vector sum is equal to or greater than a predetermined constant; and
inhibit means responsive to outputs of said first and second comparison and decision means for producing an apparatus-as-a-whole-operative signal only upon the concurrence of the ratio-lock-means-inoperative signal and the differential-means-operative signal.

8. A protective relay according to claim 7, wherein said second comparison and decision means includes effective value computing means taking in the outputs of said vector summation means and said first memory means for providing a sum of squares of the same, and second decision means for comparing output of said effective value computing means with the predetermined constant.

* * * * *

UNITED STATES PATENT AND TRADEMARK OFFICE
CERTIFICATE OF CORRECTION

PATENT NO. : 4,689,710

DATED : August 25, 1987

INVENTOR(S) : Toshio Anzai

It is certified that error appears in the above-identified patent and that said Letters Patent is hereby corrected as shown below:

Column 11, line 24, delete the word "for" (second occurrence).

Signed and Sealed this

Eighth Day of March, 1988

*Attest:*

DONALD J. QUIGG

*Attesting Officer*     *Commissioner of Patents and Trademarks*